United States Patent [19]
Roncelli

[11] 3,930,778
[45] Jan. 6, 1976

[54] MOLDING EJECTOR DEVICE FOR INTERCHANGEABLE MOLDS

[76] Inventor: Paul E. Roncelli, 4630 W. Maple Road, Birmingham, Mich. 48010

[22] Filed: July 24, 1974

[21] Appl. No.: 491,394

[52] U.S. Cl.......... 425/192; 425/242 R; 425/436 R; 425/436 RM; 425/444
[51] Int. Cl.² .......................................... B28B 7/10
[58] Field of Search...425/192, 436 R, 444, 436 RM, 425/242 R

[56] References Cited
UNITED STATES PATENTS

| | | | |
|---|---|---|---|
| 2,564,615 | 8/1951 | Tallberg | 425/450.1 |
| 3,197,825 | 8/1965 | Hammond | 425/444 X |
| 3,357,057 | 12/1967 | Bucy | 425/444 X |
| 3,555,620 | 1/1971 | Bucy | 425/192 X |
| 3,737,268 | 6/1973 | Ryder | 425/192 |

*Primary Examiner*—Robert L. Spicer, Jr.
*Attorney, Agent, or Firm*—Allan J. Murray

[57] ABSTRACT

Ejector pins are carried by an ejector device, and are releasably secured in said device by latch means. Release of the ejector pins by said latch affords withdrawal, or replacement, or redistribution of said pins through a mold support plate, without removal of the ejector device from the molding machine assembly. A plurality of holes in the support plate coincides in number and distribution with a plurality of sockets in a carriage plate in the ejector device, to afford alternative groupings of ejector pins to accommodate various mold contours of interchangeable mold plates.

15 Claims, 6 Drawing Figures

MOLDING EJECTOR DEVICE FOR INTERCHANGEABLE MOLDS

FIELD OF THE INVENTION

The field of invention lies in the area of replaceable ejector means for injection molds.

BACKGROUND OF THE INVENTION

In prior practice, a first mold plate having a first mold cavity is disposed within a usually rectangular hole in a cavity plate, so that the surfaces of the mold plate and the cavity plate are substantially flush. Both the first mold plate and the cavity plate are secured to a support plate to constitute a first mold assembly. A second, complementary mold assembly, having a second mold cavity is then juxtaposed with the first described mold assembly to form a complete mold cavity, and material to be molded is injected into said cavity and allowed to set. The complementary mold assembly is then withdrawn and it becomes necessary to remove the molded article from the first mold cavity. This is normally done with ejector pins, which are movable in unison through said holes in the support plate, and are grouped in a pattern dictated by the contour of the first mold cavity.

Consequently, each time new mold cavity plates are inserted in a molding machine assembly, a new pattern for the ejector pins may be required. If so, the support plate must then be redrilled to establish such a pattern, conforming to the contour of the new mold cavity. Eventually, the support plate has such numerous holes that there is not enough metal left to accommodate new patterns, and the support plate must be replaced.

Further, the pins are normally headed pins, received in sockets in an ejector carriage plate, and are secured in said sockets by a retaining plate, apertured to pass the shanks of the headed pins, but not their head. Thus, to change a pattern of ejector pins, an ejector housing must be disassembled from the support plate, so that the ejector drive may be removed. Then the retainer plate must be removed so that the then existing pins may be withdrawn. Then the carriage plate must be redrilled to receive a new pattern of ejector pins, and, of course, accommodations must be made for the heads of the ejector pins. Eventually, of course, the carriage plate, like the support plate, must be replaced, because its metal will have been drilled and machined to the point that it cannot accommodate any further patterns of pins.

SUMMARY OF INVENTION

Invention resides in the provision of headless pins, each having an end portion received in a socket of the ejector carriage plate. Each said end portion is formed with an annular groove, whereby said latch member may slidingly engage with or disengage from said groove, to retain the ejector pins in the sockets or afford their withdrawal.

The ejector carriage plate is formed, as aforesaid, with a plurality of sockets, and the support plate is formed with a complementary plurality of holes. When a new mold plate with a new mold contour is to be placed in the assembly, the old mold plate must first be removed. The latch mechanism may then be slid to release the ejector pins, which may be withdrawn through the support plate.

The mold cavity of the new mold plate will have appropriate holes for ejector pins predrilled to correspond to holes in the support plate and sockets in the ejector carrying plate. Normally it is desirable to have a master template so that the positioning of the ejector holes in the mold plate will correspond with the holes in the support plate. New ejector pins are inserted in a pattern determined by the contour of the mold cavity, and the latch member is slid to its latching position, and thus the pattern of ejector pins has been changed without the necessity of drilling new holes in the support plate nor of drilling new sockets in the ejector carrying plate. A retainer plate is removably superimposed upon the carriage plate to retain the latches thereon, and said retainer plate is formed with a plurality of holes corresponding in number and distribution to the holes in the support plate, and the sockets in the carriage plate.

This invention is embodied in the construction hereinafter described and illustrated in the accompanying drawings, wherein.

Figure 1:
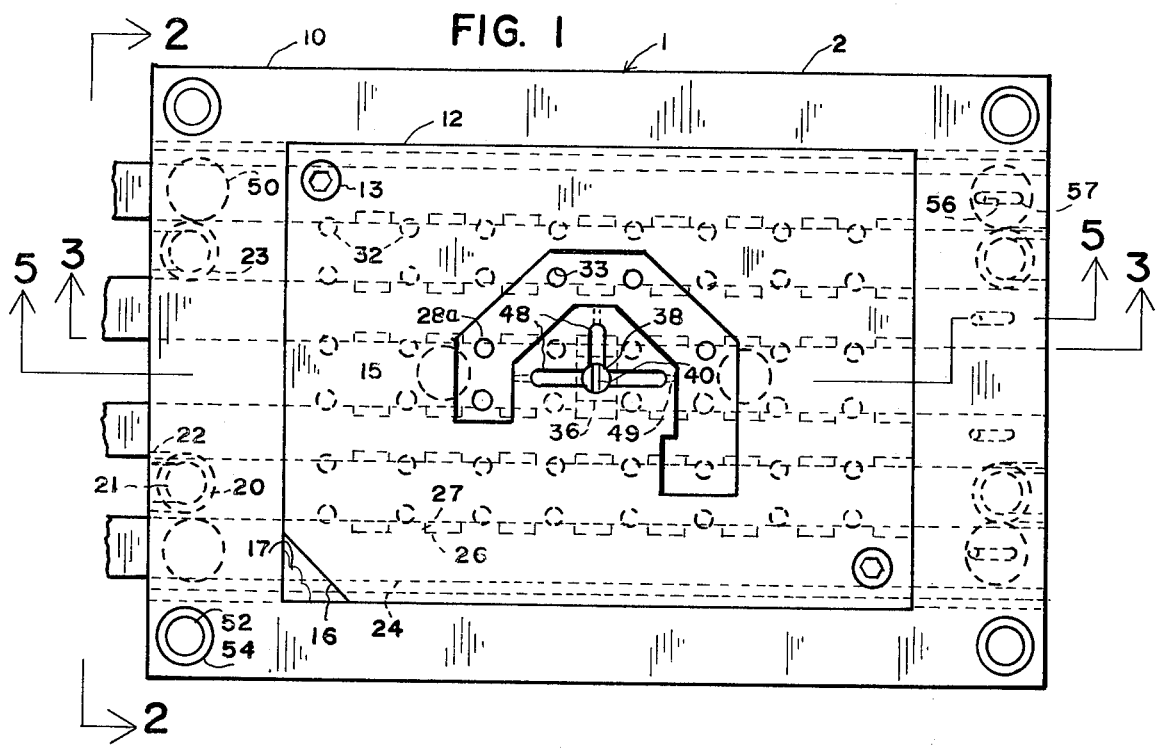
FIG. 1 is a horizontal view in partial section taken on line 1—1 of FIG. 2, with the complementary mold assembly not shown.

In these views, the reference character 1 designates a lower, or first mold assembly, and the reference character 2 designates an upper, or second mold assembly, complementary to the lower mold assembly. The second mold assembly includes an upper cavity plate 3 having secured thereto, as by screws (not shown), a cover plate 4. The upper cavity plate is formed with a rectangular opening to receive a correspondingly shaped upper mold plate 5, secured to said cover plate as by screws 6.

The first mold assembly 1 includes a lower cavity plate 10 secured as by screws (not shown) to support plate 11, and rectangularly apertured to receive a lower mold plate 12. Screws 13 removably secure said lower mold plate to the support plate 11.

Figure 2:
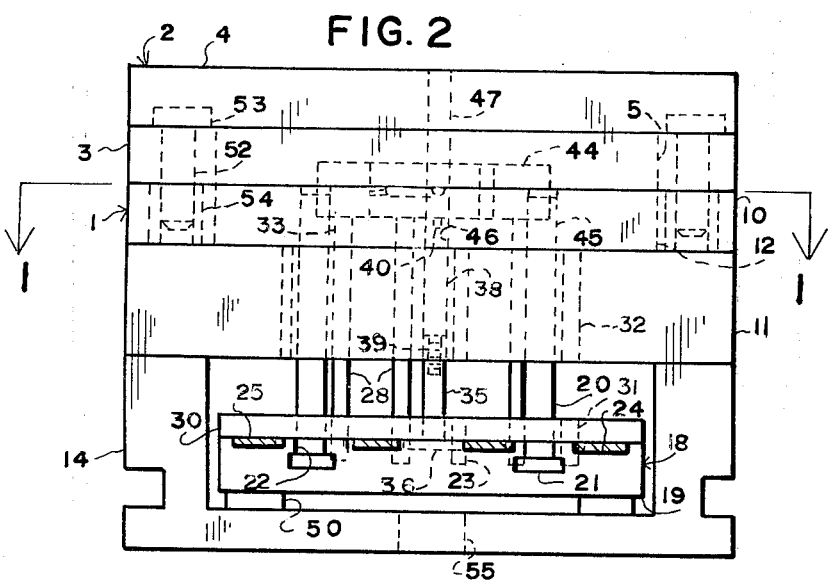
FIG. 2 is an end, elevational view of the device taken on line 2—2 of FIG. 1, with the first mold assembly and the complementary mold assembly illustrated in the position for injection molding of an article.
Figure 6:
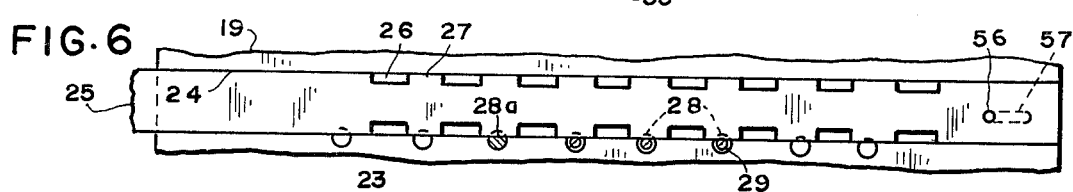
FIG. 6 is a partial, horizontal, sectional view taken on line 6—6 of FIG. 5 to further illustrate the configuration of the aforesaid sliding latch.
Figure 5:
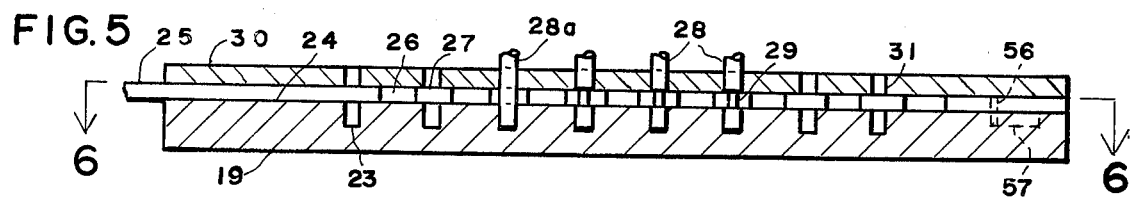
FIG. 5 is a longitudinal, partial, sectional view taken on line 5—5 of FIG. 1 to illustrate a latch mechanism having sliding travel to engage or disengage the ejector pins.

A housing 14 of general U-shape as seen in FIG. 2, is secured to the support plate as by screws (not shown). Support plate reinforcing pillars 15 are disposed in said housing, and extend between the bottom wall thereof and the bottom surface of the support plate, as may be clearly seen in FIGS. 3 and 4.

To insure that a mold plate may be installed only in its correct orientation in a cavity plate, it is desirable to truncate a corner 12 of such plate, and to weld excess material 16 in the corresponding corner of the mold cavity plate (as illustrated in FIG. 1) so that only the truncated corner will fit in the corner with the welded material.

The ejector assembly 18 includes a carriage plate 19 provided with kick-back pins 20, which extend slidably through the support plate 11. The kick-back pins are formed with heads 21, and the headed ends of said pins may be inserted into slots 22, formed in the carriage plate 19. The carriage plate has formed in its upper surface a plurality of predeterminedly spaced sockets 23. Slideways 24 receive slidable latches 25. Said latches are formed with a plurality of notches 26 spaced so as to leave protruding lugs 27. Ejector pins 28 each have an end portion formed with an annular groove 29, and said end portion is received in a socket 23. A retainer plate 30 is formed with holes respectively registering with the respective sockets 23 and is secured to the carriage plate as by screws (not shown). The retainer plate secures the latches 25 against escape from the carriage plate, and the latches, as hereinafter explained, restrain the ejector pins from escape from sockets 23.

The support plate 11, is also formed with a plurality of holes which conforms in number and distribution to the sockets 23 in the carriage plate 19, and to the holes 31 in the retainer plate 30, and which holes are respectively in registration with said respective holes 31 and sockets 23. FIG. 1 shows in dash line the plurality of holes 32 in the support plate 11, and as may be seen in FIG. 1, the pattern of knock-out pins 28 may be determined by the configuration of the mold cavity. The positioning of the holes in the mold plate 12 will be determined from a master template (not shown) from which the selection of holes in the support plate 11, and in the retainer plate 30, as well as the sockets in the carriage plate 19 will also be determined.

Figure 3:
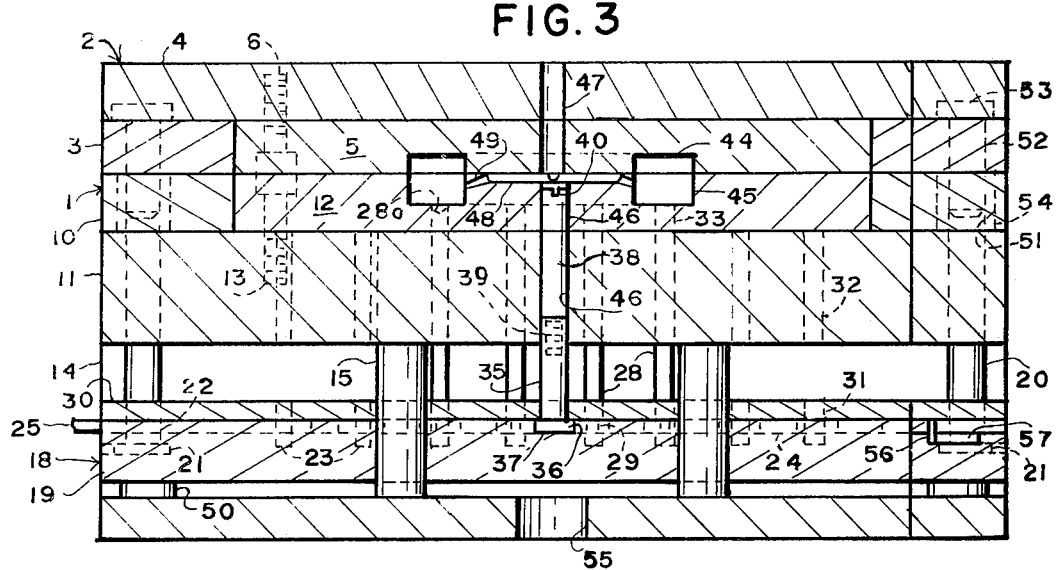
FIG. 3 is a longitudinal, vertical, sectional view taken on line 3—3 of FIG. 1, showing the first mold assembly and the second mold assembly juxtaposed for molding an article, and showing the ejector pin device in its retracted position.
Figure 4:
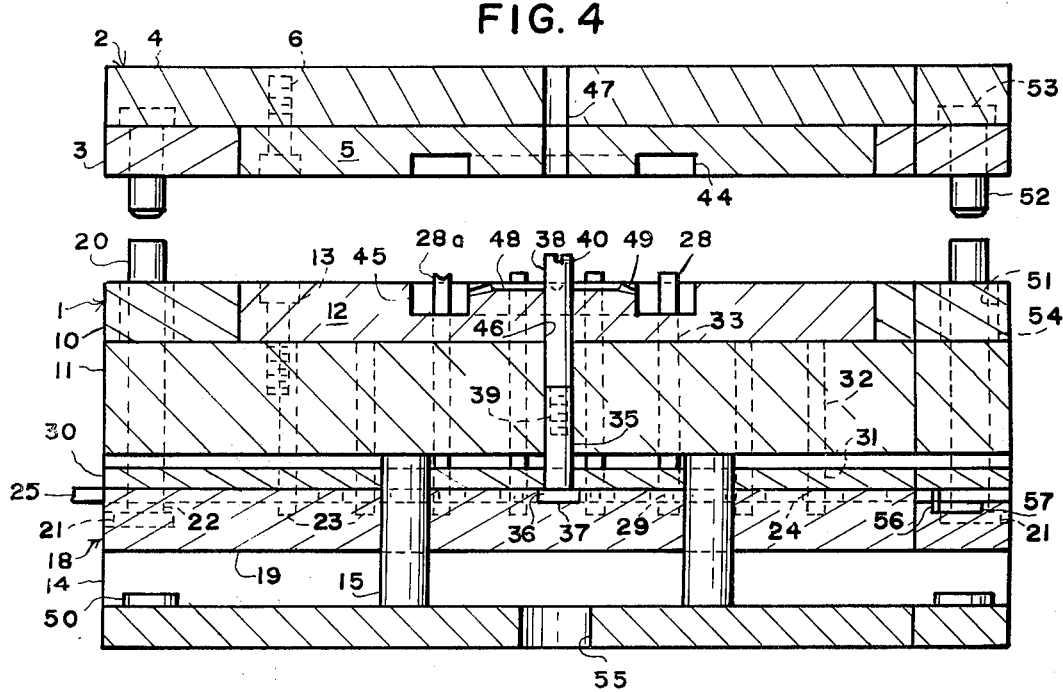
FIG. 4 is a view similar to FIG. 3, showing the second mold removed from the first mold, and showing the ejector pins and the ejector pin device in a ejecting position, with the various pins protruding into the mold cavity.

A special sprue ejector pin is shown, having a shank 35 downwardly terminating in a square head 36 to be received in a groove 37, as may best be seen in FIGS. 1, 3, and 4. The groove 37 extends between two of the slideways 24. The sprue ejector pin is formed with an upward extension 38, which, at 39, has a threaded connection with the shank 35. It is sometimes desirable to have a contour of some nature, such as a slot 40, formed in the top face of the upward extension 38 of the sprue ejector pin. It is also sometimes desired to orient said contour always in the same direction, even when different mold plates are installed. It should be noted that the slot 40 would enable the sprue pin extension 38 to be applied and withdrawn by means of a screwdriver, without removal of the housing 14, and further, without disassembling the ejector device 19, 25, and 30.

The mold cavity comprises two partial cavities, an upper, or second mold cavity 44 and a lower, or first mold cavity 45. Obviously, the two cavities must be juxtaposed as seen in FIG. 3 in order to function as a mold cavity. The upper mold plate 5 is formed with an injection hole 47, which further extends through the cover plate 4. It is understood, that as the injection hole forms no part of the invention, and the disclosure thereof in the drawings is merely illustrative, and would not necessarily be in the form such a hole would take. Sprue channels 48 permit the flow of molding material through the gate holes 49, and into the mold cavity. A hole 46 is formed in the first mold plate to receive the extension 38 of the sprue knock-out pin.

Thus, the arrangement is such that when an article has been molded and the material has set, the upper mold assembly is retracted from the lower mold assembly, and the ejector device is moved to drive the ejector pins into the cavity to simultaneously eject the molded article, and the sprue. Ejection of the molded article and sprue breaks the connecting material at the gates 49, so that the molded article is separated from the sprue which is necessarily formed by the design of the mold.

Wear pads 50 may be positioned on the bottom wall of the housing 14, to resist wear from the repeated operation of the ejector device. Holes 51 are formed through the lower mold cavity plate 10, and receive bushings 54. The upper mold assembly carries guide pins 52, having heads 53 secured in the cover plate 4. As may be obvious from FIGS. 2, 3, and 4, the guide pins are received in said bushings 54 to guide the upper mold assembly into the necessary juxtaposition with the lower mold assembly for the molding of an article.

It should be noted that the bottom wall of the housing 14 is apertured as at 55 to receive an actuating mechanism (not shown) which will drive the ejector assembly to the position shown in FIG. 4 to effect the ejection of a molded article. A further drive mechanism (not shown) carries the upper mold assembly to and from the necessary mold forming juxtaposition with the lower mold assembly.

To limit the sliding travel of the latches 25, said latches are provided (as seen at the right of FIGS. 1, 2, and 4) with downwardly dependent pins 56. Grooves 57 are formed in the upper face of the lower cavity plate 10 to receive the lower portions of said pins, and, of course, the length of the grooves limits the sliding travel of said latches 25.

The above described mechanism is believed to be superior to various earlier mechanisms, in that the sockets 23, in conjunction with the holes 32 in the support plate 11, and the holes 31 in the retainer plate 30, allow the utilization of a substantial variety of ejector pin patterns as determined by the mold cavities of various mold plates which may be installed in the respective upper and lower cavity plates 3 and 10. Clearly the positioning of the mold cavity in the mold plates may be guided by the predetermined location of the plurality of said holes. It is therefore possible to relocate ejector pins to conform to virtually any configuration of mold cavity without the necessity of redrilling holes in the support plate 11 and the retainer plate 30, and, of course, without redrilling the sockets 23 in the carriage plate 19.

A further and distinct advantage is derived from the employment of the latches 25. In previous practice, as was noted earlier, headed ejector pins would be imprisoned as by a retainer plate 30 in grooves or sockets formed in the carriage plate 19. Consequently, when it is desired under prior practice to change the positions of ejector pins to conform to new mold configurations, it would be necessary to removed the housing 14 and withdraw the ejector assembly. It would then be necessary to remove the retainer plate 30 from the ejector assembly, and then remove the ejector pins. It would then be necessary to remove the support plate from the cavity plate, and drill new holes conforming to the contour of the new mold, and of course, either replace the carriage plate or rework it to receive the headed ejector pins.

With the present invention, it is necessary only to remove the lower mold plate 12, and slide the latches 25, so that the lugs 27 are disengaged from the annular grooves 29 of the ejector pins. Once this is done, the ejector pins can be readily slipped out through the top of the support plate, and relocated to conform to the mold cavity of a new mold plate to be installed. Also, the sprue ejector pin may be similarly replaced, should a longer or shorter extension be required. The square head 37 of a sprue ejector pin being engaged in the groove 38 will not rotate, and thus the threaded connection to 39 of the shank 35 and the extension 38 may be employed to remove the old extension and install a longer or shorter extension as may be determined by the requirements of a new mold cavity.

It may sometimes be desired to impose a specific contour on the upper surface of an ejector pin 28a, and orient said contour in a specific direction. If so, the annular groove is omitted, and a slot 28b is formed in place of such groove, and so disposed on the pin that engagement in said slot of a lug on said latch will resist rotation of the pin.

As stated above, it is proposed that a master template will be used to locate the rows of holes 31, 32, and the sockets 23 prior to assembly of the lower mold. Also, for each new mold plate to be installed in the device, the master template can be used to establish the location of the mold contour in the most suitable location to take advantage of a particular arrangement of the plurality of ejector pin holes. When the upper mold assembly is brought into molding juxtaposition with the lower mold assembly, the upper assembly contacts ejector pins 20 to return the ejector device to its retracted position.

While the machine is illustrated with its components oriented for vertical movement, it may be rotated 90°, so that an ejected sprue, and molded article will drop from between the mold plates.

What I claim is:

1. In a machine for molding articles, including a mold member having a mold cavity,
    one or more headless ejector pins having reciprocable travel from said mold member to a rest position, and toward said mold member to an ejection position to eject a molded article from said mold cavity,
    a carriage to carry said ejector pins in said reciprocable travel, said ejector pins being releasably mounted in said carriage,
    latch means movable on said carriage, between a locking position to engage said ejector pins and resist their withdrawal from said carriage, and a release position to release said ejector pins and afford their withdrawal from said carriage,
    means adapting said ejector pins for said engagement,
    means to retain said latch means movably on said carriage.
2. A machine as set forth in claim 1, including,
    a support member to support said mold member, said support member being interposed between said mold member and said carriage,
    one or more holes in said support member to afford said travel of said ejector pins through said support member.
3. In a machine as set forth in claim 2,
    means to limit the travel of said carriage from said mold member and establish the rest position of said ejector pins,
    said ejector pins being removably insertable through said holes in said support member, when said latch means is in its release position.
4. In a machine as set forth in claim 3,
    one or more sockets formed in said carriage, said sockets being respectively registered with said respective holes in said support member, and
    an end portion of each said ejector pin being removably received in a socket.
5. In a machine as set forth in claim 1,
    said ejector pins being distributed in a predetermined pattern on said carriage,
    said carriage being addapted to accommodate alternative predetermined patterns of distribution of saids ejector pins.
6. In a machine as set forth in claim 5,
    a support member to support said mold member, said support member being interposed between said mold member and said carriage,
    a plurality of holes in said support member to afford said travel of said ejector pins,
    said holes being distributed to accommodate said alternative patterns of ejector pins.
7. In a machine as set forth in claim 6,
    said carriage being formed with a plurality of sockets,
    said sockets conforming in number and distribution to said holes in said support member,
    each respective hole being registered with a respective socket,
    an end portion of each ejector pin being received in a respective socket.
8. In a machine as set forth in claim 7,
    a housing enclosing said carriage, and secured to said support member,
    said latch means being elongated, and having opposite parallel side portions,
    a series of lugs formed on at least one of said marginal edge portions,
    a slideway on said carriage to receive each latch member for longitudinally directed reciprocable sliding travel,
    means adapting an end portion of each ejector pin for engagement or disengagement by a lug on said latch member,
    each ejector pin being removably insertable into a respective socket through a respective hole in said support member.
9. In a machine as set forth in claim 8,
    said means adapting said end portion being an annular groove releasably engageable by a lug on said latch member.
10. In a machine as set forth in claim 1,
    said molded article having a sprue,
    a sprue ejector pin comprising,
    an elongated shank, and
    an elongated extension removably applicable to said shank,
    said shank being received in said carriage,
    means on said shank to resist rotation of said shank about its longitudinal axis,
    means on said carriage co-acting with said means on said shank to resist such rotation.
11. In a machine as set forth in claim 10,
    a support member to support said mold member,
    a hole in said support member to afford passage therethrough of said sprue ejector pin, whereby said elongated extension may be removed and replaced through said hole in said support means.

12. In a machine as set forth in claim 4,
said latch means being elongated, and having opposite parallel marginal side portions,
a series of lugs formed on at least one of said marginal edge portions,
a slideway on said carriage to receive each latch member for reciprocable sliding travel,
means adapting said end portion of said ejector pin for engagement by a lug on said latch member in the locking position of said latch member, and to be disengaged by such lug in a release position of said member.

13. In a machine as set forth in claim 12,
said means adapting said end portion being an annular groove formed on said end portion of said ejector pin for releasable engagement by a lug.

14. In a machine as set forth in claim 3,
said means to limit the travel of said carriage being a housing,
means securing said housing to said support member, said carriage being confined within said housing.

15. In a machine as set forth in claim 1,
said means adapting said ejector pin for said engagement being a groove formed in said ejector pin and, having a flat bottom, and releasably engageable by said latch means to resist rotation of said ejector pin about its longitudinal axis.

* * * * *